July 8, 1930.  W. C. WEBER  1,770,353
TREATMENT OF PULPS
Filed Dec. 5, 1925
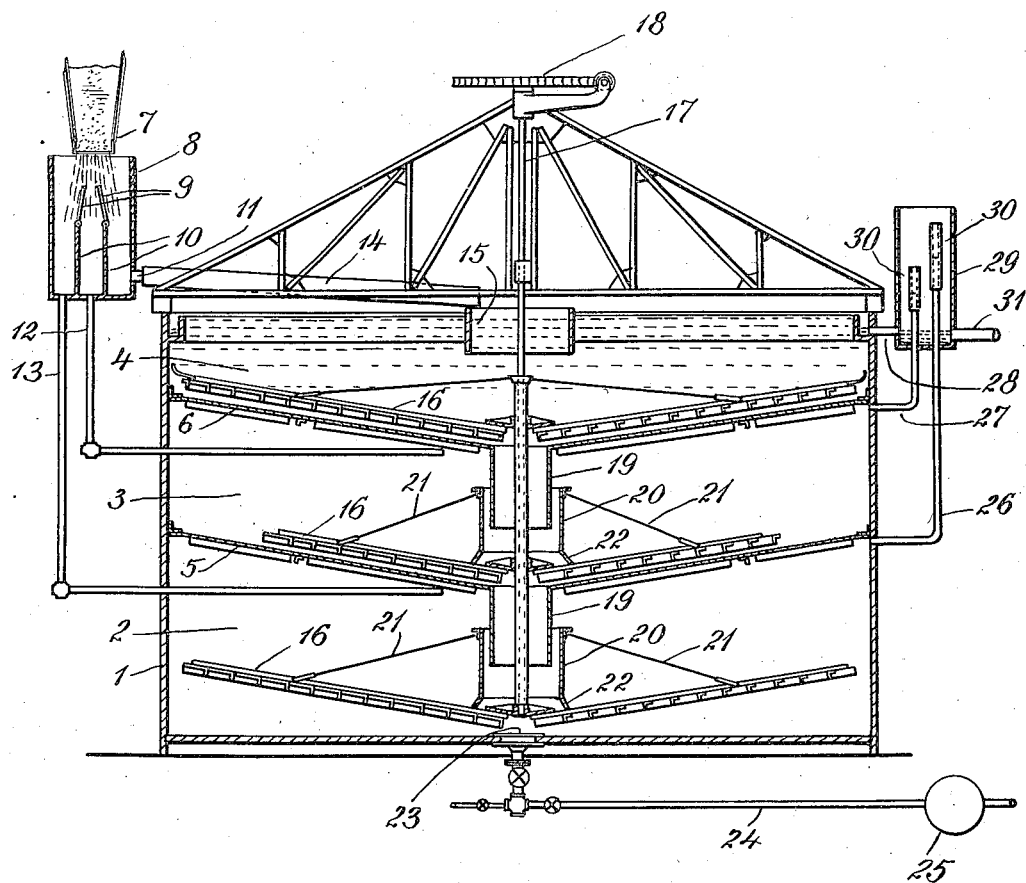
INVENTOR
William C. Weber
BY
Pennie, Davis, Marvin, & Edmonds
ATTORNEYS Patented July 8, 1930

1,770,353

UNITED STATES PATENT OFFICE

WILLIAM C. WEBER, OF LARCHMONT, NEW YORK, ASSIGNOR TO THE DORR COMPANY, OF NEW YORK, N. Y., A CORPORATION OF DELAWARE

TREATMENT OF PULP

Application filed December 5, 1925. Serial No. 73,324.

This invention relates to improvements in the treatment of pulps and has for its object the provision of an improved method and apparatus for thickening pulps.

More particularly, this invention relates to improvements in the sedimentation of solids from liquid suspensions and is especially directed to an improved multiple compartment unit of the type generally known as a tray-thickener, such as is disclosed in United States Patents Nos. 1,135,997 and 1,237,745.

Throughout this specification and the appended claims the term "pulp" is intended to define any mixture of solid material and a liquid. In the industrial arts, and more especially in chemical and metallurgical industries, pulps are subjected to various kinds of treatment. Thus, for example, the treatment of the pulp may involve the removal or separation of the solid material from the liquid, or the treatment may involve the separation by solution in the liquid of a valuable element or elements from worthless or less valuable substances contained in the solid material, or the treatment may involve washing of the solid material to free it from liquid containing dissolved substances. The present invention is particularly concerned with apparatus for and treatment processes of this character, but I wish it to be understood that the invention is not limited in its application to the particular kinds of treatment processes specified above.

For the sake of simplicity, the present invention will be hereafter particularly described in connection with the separation of finely divided solids from liquids in which they are suspended or the separation of quickly settling solids from those suspended in the same liquid and which settle more slowly. It is to be understood, however, that the present invention is particularly described in connection with this kind of pulp treatment by way of example, and those skilled in the art will readily recognize the application of the invention to such other processes of pulp treatment as is hereinbefore mentioned and the advantages of the invention resulting from such application.

The treatment of pulps involving the removal or separation of solids contained therein or in which such solids are suspended may be advantageously effected by sedimentation in various forms of settling tanks or basins. The well known Dorr thickener or settling apparatus is an example of a settling tank or basin well adapted for this purpose. When a settling tank or basin is used for the continuous segregation of a pulp into two products one of which is a more or less clear liquid and the other is solids with a certain amount of liquid entrained therein, continuous removal of the settled solids should be brought about by some method that will insure exact control of the rate of removal of the solids and of the supernatant liquid as well as of the feed pulp so that the settling tank may be continuously worked at its best efficiency.

The present invention contemplates the improvement in the treatment of pulps involving the removal of thickened sludge or solids therefrom by sedimentation or settling in which the discharge of supernatant liquid from the body of pulp undergoing sedimentation is regulated in response to the rate of accumulation of solids therein which varies as the quality of the pulp feed fluctuates. More particularly, the method of the present invention involves balancing the hydrostatic pressure of the discharging supernatant liquid with the hydrostatic pressure of the discharging thickened sludge material.

For the sake of uniformity and simplicity, the mixture of solids and liquids to be treated in accordance with the principles of the present invention will throughout this invention and the appended claims be referred to as "pulp"; the more or less clear liquid withdrawn or decanted from the body of pulp undergoing sedimentation will be referred to as "supernatant liquid"; the settled solids or thickened material will be referred to as "sludge".

In the practical operation of pulp thickeners of the types shown in the patents above referred to, it has been found that the manipulation of the discharge of sludge from the various compartments or trays, as they are generally called, presents a difficult problem. In the earlier patent the sludge is discharged separately from each compartment; and, while this arrangement makes it possible to obtain the full sedimentation or settling efficiency of each compartment, it has in practice produced such a complicated system of sludge withdrawal, that it has fallen into disuse. This is due not only to expense, but to the fact that in many installations the sludge lines have a tendency to plug up; and this tendency is not only intensified by a separate sludge withdrawal system, but the latter, furthermore, is extremely difficult to clean out after plugging has occurred.

These difficulties have been avoided by the arrangement disclosed in the latter patent above referred to; but, since in the latter the feed passes downwardly through central openings in the trays, a different condition of settling is produced, owing to the effect of the flow of feed. It has been found in practice that under these conditions the maximum settling efficiency of the various compartments is not obtained; that is, four superposed compartments of a given size do not with this arrangement have four times the settling capacity of a single compartment of that size, but substantially less capacity.

A particular object of this invention is to provide a tray thickener in which the sludge from the various compartments is removed through a common passage in a simple manner, while retaining the settling efficiency of each compartment at substantially the efficiency of a separate compartment of the same size. In obtaining this object, an arrangement has been evolved in which a hydraulic balance is established between the discharges of supernatant liquid and sludge from the various compartments so that the apparatus will automatically care for ordinary fluctuations of pulp feed to the different compartments, and will provide ready means for indicating variations in feed to any compartment beyond those which will be automatically cared for.

The idea of balancing the hydrostatic pressure of the separate discharging columns of supernatant liquid with the hydrostatic pressure of the common column of discharging sludge is based on the theory that a column of sludge can be balanced and held in equilibrium by a higher column of supernatant liquid provided the supernatant liquid column is arranged to exert its pressure downward on the surface of the pulp; thus, the sludge in the upper compartment or tray and the sludge in the downcast boot are the sludge column that it is desired to balance and hold in equilibrium by an adjustable supernatant liquid column, or columns, consisting of the supernatant liquid in the overflow pipe and upper part of the lower compartment or tray. The downward pressure of the sludge column is transmitted to the sludge in the lower part of the bottom compartment, and is transmitted by that sludge as an upward pressure against the supernatant liquid column which tends to make the sludge rise. This, however, is offset by the greater weight of the supernatant liquid column due to its super-elevation (that is, height of compartment overflow above the tank supernatant liquid level). The real point of equilibrium or balance is on a plane horizontal to the bottom of the downcast boot, but the sludge in the boot is kept from being diluted by the balancing liquid column with normal movements due to the sealing effect of the sludge surrounding the boot.

The novel features of the present invention will be best understood from the following description taken in conjunction with the accompanying drawing in which is shown a vertical transverse sectional view through one form of pulp thickening apparatus.

The pulp thickening apparatus 1 of the invention comprises a plurality or series of superposed sedimentation or settling trays or compartments 2, 3 and 4, which may conveniently be formed by installing in tank 1 a plurality of transverse partitions or trays 5 and 6, sloping slightly downward toward the center in accordance with standard practice in tray thickeners of this type.

A pulp feed trough 7 leads from the pulp source (not shown) into the pulp feed splitter-box 8. This box is provided with lateral adjustable and vertically pivoted vanes 9, and is also divided into separate feeding compartments for each separate settling compartment by the partitions 10. Feed pipes 11, 12 and 13 connect with the respective compartments of the feed splitter-box and lead into the sedimentation compartments 4, 3 and 2 of the tank 1 respectively. Pipe 11 runs into the launder 14 which ends at feed well 15 in the upper compartment of the tank, in accordance with the usual practice. Feed pipes 12 and 13 lead to the side wall of the tank 1 into the middle and lower sedimentation compartments respectively, preferably near the upper part thereof as well as near the center.

The rotating rakes 16 are carried by a central shaft 17 rotated by appropriate gearing 18 operatively connected to a motor (not shown) in the usual well known manner. Downcast conduits or boots 19 form a continuation of the tray bottoms of the upper and middle compartments and extend downwardly into the subjacent compartments, preferably to a point as close to the bottom thereof as is practicable without interfering with the vertical adjustment of the mechanism, the flow of sludge to the center under impulse of the rakes, or interference with the rake supporting structure.

The down-cast boots 19 are also preferably provided with an enveloping conduit or boot 20 which extends around and immediately adjacent to the lower part of each boot 19 and downwardly to a point as close to the bottom of the compartment as is feasible without interfering with the rake action or sludge movement from the compartment. Each boot 20 is in any event vertically slidable relative to the corresponding down-cast boot 19, and may be mounted on the rakes 16 providing a convenient connection for tie rods 21 which support the rakes and permitting vertical adjustment of the rakes in the usual manner without interference with the down-cast boot 19. The lower end of each boot 20 may be flared outwardly as at 22 to accommodate the rake supports and to permit closer approach to the tray bottom, thus providing a zone of suitable cross section for the underflow of sludge from the adjacent compartment into the central sludge discharge passage or column.

A central sludge outlet 23 in the bottom compartment is connected with the sludge discharge pipe 24 connecting with a diaphragm or other constant displacement type pump 25 which should be adjustable to vary the rate at which the sludge is withdrawn. Discharge or overflow pipes 26, 27 and 28 lead from near the upper parts of the lower, middle and upper sedimentation compartments respectively into the supernatant liquid overflow box 29. Overflow pipes 26 and 27 are equipped at their upper ends with appropriate adjustable sleeves or extension rings 30 which can be raised or lowered as desired. Outlet pipe 31 is attached near the bottom of the overflow box.

The operation is as follows: A regulated volume of pulp is continuously fed into the feed splitter-box 8 where it is sub-divided as nearly as possible into three separate portions. One portion flows by way of pipe 11 into the upper sedimentation compartment of tank 1; a second portion passes by way of pipe 12 into the middle compartment; and the third portion is conducted through pipe 13 into the lower compartment. The adjustable rakes 16 are made to rotate in their accustomed manner as the sedimentation or settling process of the pulp is under way. The thickened sludge material is gradually made to gather at the bottom of each separate compartment. In the case of the upper compartment, the sludge material will gradually work its way down into the down-cast boot 19 of the middle compartment, whereas the settling sludge material of the middle compartment will gradually find itself led into the down-cast boot 19 of the lower subjacent compartment. In the practice of the invention it is desirable that a joint column of sludge material be maintained through these down-cast boots extending from the very bottom of the sludge outlet 23 to the sludge level of the upper compartment. In order to make this possible so that none of the unsettled pulp liquid may find its way into the thickened sludge so as to act as a diluent, the down-cast boots 19 are so arranged as to always have their lower ends extend well below the sludge level constantly maintained in each compartment.

The thickened sludge material gradually finds its way down to the sedimentation tank outlet 23 into the pipe 24 from which it is pumped steadily and continuously by means of an appropriate pump 25. This pump can of course have its output capacity varied to suit varying qualities of pulp that are to be subjected to this settling treatment.

The supernatant liquid from the compartments 4, 3 and 1 gradually finds itself forced through discharge pipes 28, 27 and 26 into the overflow box 29. These discharge pipes are preferably so arranged that the clear liquid may be withdrawn from near the very top of each separate sedimentation compartment. In order that the hydraulic pressures of the discharging sludge and the separate discharging supernatant liquid may be kept in equilibrium, adjustable sleeves 30 may be raised or lowered as the changing conditions within the settling compartments demand. The supernatant liquid is finally passed through the outlet pipe 31. A uniformly thick underflow of sludge material is desired. It should be understood that the amount of thickened and semi-thickened sludge that is retained in the central or joint discharge conduit and in the several compartments is a function of the supernatant liquid hydrostatic head maintained through the medium of the adjustable sleeves 30. For most efficient settling conditions, it is desirable to maintain the sludge levels as high above the bottom of the down-cast boots 19 as possible without interfering with the pulp feed or with the overflow of supernatant liquid. The hydrostatic pressure of this volume of sludge and semi-thickened sludge will vary with wide fluctuations in the pulp feed rate or changes in character of the solids content of the pulp to be treated. And the adjustable sleeves permit the balancing of the supernatant liquid pressure with the sludge and semi-thickened sludge pressure, whatever is may be.

It is thus seen that according to the present invention two columns are balanced in each compartment. The so called supernatant liquid column in fact comprises the overflowing column of clear liquid, the material undergoing sedimentation (which is of substantially uniform average density) and the sludge bed in the bottom of the compartment located above the sludge outlet therefrom. The other column comprises the sludge in the central column above said outlet, plus the material above such sludge in the uppermost compartment (which is of substantially uniform average density).

If the height of the supernatant liquid column in any one compartment is increased, and it is desired to re-establish a balance between the two columns, it will be necessary for the sludge bed in that compartment to be reduced, which will take place by an increased rate of sludge flow from the compartment until the balance is restored. A lowering of the overflow column will of course have the opposite effect.

There is, moreover, a second general result of alteration in the total pressure on the central sludge column exerted by the overflow column, which operates in addition to the phenomena just described. As the total height of the central sludge column balances the total hydrostatic head of the supernatant liquid outlet, it is apparent that a change in the total pressure from the latter will tend to change the total height of the central sludge column. This means that the sludge level in the uppermost compartment, which of course determines the total height of the central sludge column, will vary whenever there is a change in the total hydrostatic head of all the supernatant liquid columns; and by adjusting all of the supernatant liquid column overflows simultaneously, it is possible to retain the same sludge depth in each compartment and yet vary the height of the sludge bed in the uppermost compartment. This is a phenomenon separate from that described above, but it has a relationship thereto in that the adjustment of any one supernatant liquid overflow will change the total pressure of the supernatant liquid overflows, and will therefore affect not only the sludge level in the compartment from which the adjusted supernatant liquid overflow extends, but also the sludge level in the uppermost compartment.

Unlike the thickeners heretofore employed, the settled solids or sludge are positively confined during their travel downwardly from one compartment to another so that diffusion or dilution of the descending sludge is avoided. In this manner the capacity of the various compartments is raised to that of separate thickeners of the same dimensions.

The hydraulic pressures of the columns of discharging supernatant liquid are balanced against the hydraulic pressure of the single continuous column of discharging sludge in order to assure uniform operation of the various compartments. Since a continuous column of sludge is maintained from the bottom of the top compartment to the bottom of the bottom compartment, pulp feed cannot move from one compartment to another. Each compartment is separately fed with fresh pulp feed. The supernatant liquid column overflow serves fundamentally to control the amount of sludge in the compartment from which it leads.

In the practice of my invention it is possible to practically double the thickening capacity of each compartment or tray; a thicker or more uniform underflow of sludge is obtained than has heretofore been possible; but one sludge underflow control pump is necessary; absolute control over pulp conditions in each separate compartment is obtained through the medium of adjusting the overflow of supernatant liquid to balance the hydraulic pressure of the discharging column of thickened sludge; the thickening load of sludge can be juggled between various compartments or trays to suit local conditions; once the overflow of supernatant liquid is adjustably set for normal operating conditions of pulp treatment, it would not have to be touched and will always hold a correct depth of pulp to give the thickest possible underflow of sludge at all times.

I claim:

1. The improvement in the method of simultaneously thickening superposed bodies of pulp which comprises, maintaining a continuous column of sludge of substantially uniform density from the bottom of the lowermost body of pulp to the normal sludge level of the uppermost body of pulp.

2. The improvement in the method of simultaneously thickening superposed bodies of pulp which comprises, maintaining a continuous column of sludge of substantially uniform density throughout the bodies of pulp undergoing thickening, overflowing supernatant liquid from each body, and underflowing thickened sludge from the continuous column of sludge.

3. The improvement in the method of simultaneously thickening superposed bodies of pulp which comprises, separately feeding fresh pulp to each body of pulp, maintaining a continuous column of sludge of substantially uniform density throughout the bodies of pulp undergoing thickening, regulating the discharge of supernatant liquid from each body of pulp to compensate for fluctuations in the pulp feed by balancing the hydrostatic pressure of the supernatant liquid with the hydrostatic pressure of said column of sludge.

4. An improved apparatus for simultaneously thickening superposed bodies of pulp which comprises, means for maintaining a continuous column of sludge of substantially uniform density from the bottom of the lowermost body of pulp to the normal sludge level of the uppermost body of pulp.

5. An improved apparatus for simultaneously thickening superposed bodies of pulp which comprises, means for maintaining a continuous column of sludge of substantially uniform density throughout the bodies of pulp undergoing thickening, means for overflowing supernatant liquid from each body, and means for underflowing thickened sludge from the continuous column of sludge.

6. An improved apparatus for simultaneously thickening superposed bodies of pulp which comprises, means for separately feeding fresh pulp to each body of pulp, means for maintaining a continuous column of sludge of substantially uniform density throughout the bodies of pulp undergoing thickening, means for overflowing supernatant liquid from each body, and means for underflowing thickened sludge from the continuous column of sludge.

7. The method of operating multiple tray thickeners having substantially coaxial sludge discharge passages for the several trays, which comprises establishing and maintaining a continuous column of sludge of substantially uniform density and extending through said discharge passages.

8. The method of operating multiple tray thickeners having communicating sludge discharge passages for the several trays, which comprises establishing and maintaining a continuous column of sludge of substantially uniform density and extending through said discharge passages.

9. Apparatus of the class described comprising a tank having a sludge discharge passage in the bottom portion thereof, a tray member dividing said tank into upper and lower compartments, a sludge discharge conduit providing means of communication between said upper and lower compartment and extending into said lower compartment, and a second conduit mounted within the lower compartment and telescoping with said sludge discharge conduit, said conduits cooperating to provide a passage for directing sludge toward the discharge passage in the bottom portion of said tank.

10. Apparatus of the class described comprising a tank having a centrally disposed discharge passage in its bottom wall, a tray member dividing said tank into upper and lower compartments, a centrally disposed sludge discharge conduit providing means of communication between said upper and lower compartments and extending into said lower compartment, and a second conduit within the lower compartment and telescoping with said discharge conduit, said conduits cooperating to provide a passage for directing sludge to said discharge passage in the bottom wall of said tank.

11. Apparatus of the class described comprising a tank having a sludge discharge passage in the bottom portion thereof, tray members having substantially concentric openings therein dividing said tank into a plurality of compartments, sludge discharge conduits surrounding said openings and extending downwardly therefrom, and other conduits mounted within said compartments and telescoping with said discharge conduits to provide a passage for directing sludge toward said discharge passage in the bottom portion of said tank.

12. Apparatus of the class described comprising a tank having a centrally disposed discharge passage in its bottom wall, a tray member dividing said tank into upper and lower compartments, means for introducing fresh pulp into each compartment, means for withdrawing clarified liquid from each compartment, a centrally disposed sludge discharge conduit providing means of communication between said upper and lower compartments and extending into said lower compartment, and a second conduit within said lower compartment telescoping with said discharge conduit, said conduits cooperating to provide a passage for directing sludge toward said discharge passage in the bottom wall of said tank.

13. Apparatus of the class described comprising a tank, a tray member dividing said tank into upper and lower compartments, a sludge discharge conduit providing means of communication between said upper and lower compartments and extending into said lower compartment, and a second conduit mounted within the lower compartment and telescoping with said discharge conduit, said second conduit being vertically adjustable relatively to said discharge conduit.

14. Apparatus of the class described comprising a tank, a tray member dividing said tank into upper and lower compartments, a passage for discharging sludge from said lower compartment, a sweep for moving sediment toward said discharge passage, a sludge discharge conduit providing means of communication between said upper and lower compartments and extending into said lower compartment, and a second conduit mounted on said sweep and telescoping with said discharge conduit.

15. Apparatus of the class described comprising a tank, a tray member dividing said tank into upper and lower compartments, a passage for discharging sludge from said lower compartment, a vertically adjustable sweep for moving sediment toward said discharge passage, a sludge discharge conduit providing means of communication between said upper and lower compartments and extending into said lower compartment, and a second conduit mounted on said sweep and telescoping with said discharge conduit.

16. Apparatus for simultaneously thickening superposed bodies of pulp comprising means for feeding fresh pulp to each body, means for withdrawing clarified liquid from each body, means for establishing a continuous column of sludge extending throughout said bodies of pulp, and pump means for withdrawing sludge from said continuous column.

17. The improvement in the method of simultaneously thickening superposed bodies of pulp, which comprises separately feeding fresh pulp to a plurality of bodies, establishing a continuous column of sludge connecting the bodies, and effecting the balancing of the hydrostatic pressure of the supernatant liquid of at least one lower body with pressure including that exerted by the column of sludge adjacent the discharge of the sludge from the body into the column.

18. The improvement in the method of simultaneously thickening superposed bodies of pulp, which comprises separately feeding fresh pulp to a plurality of bodies separately maintained and effectively sealed from one another, establishing a continuous column of sludge connecting the bodies and providing the sole direct communication between the bodies, and effecting a balancing of the hydrostatic pressure of the supernatant liquid of at least one lower body with pressure including that exerted by the column of sludge adjacent the discharge of the sludge from the body into the column.

19. The improvement in the method of simultaneously thickening superposed bodies of pulp, which comprises separately feeding fresh pulp to a plurality of bodies, effecting a thickening within each body comparable to normally separately operated thickening procedures of bodies of similar capacity, establishing a continuous column of sludge to effect a connection between the bodies and the sealing of the respective bodies from each other, delivering the overflow of supernatant liquid from the bodies from separate columns for assisting the balancing of the hydrostatic pressure of the supernatant liquid in each body with the hydrostatic pressure exerted in part at least by the column of sludge into which the sludge from the respective bodies is discharged.

20. The improvement in the method of simultaneously thickening superposed bodies of pulp, which comprises separately feeding fresh pulp to a plurality of bodies, establishing a continuous column of sludge to connect the bodies and to assist in effecting a seal therebetween, confining the continuous column of sludge to substantially eliminate contact of the sludge within the column with the supernatant liquid, and effecting the balancing of the hydrostatic pressure of the supernatant liquid of at least one lower body with the pressure exerted in part at least by the column of sludge adjacent the discharge of the sludge from the body into the column.

21. The improvement in the method of simultaneously thickening superposed bodies of pulp, which comprises separately feeding fresh pulp to a plurality of bodies, establishing a continuous column of sludge connecting the bodies, providing an effective seal between the bodies, effecting a discharge of the sludge in the continuous column at a rate substantially constant with respect to the total solids fed to the bodies for maintaining the continuous column, and effecting the balancing of the hydrostatic pressure of the supernatant liquid of at least one lower body with the pressure exerted in part at least by the column of sludge adjacent the discharge of the sludge from the body into the column.

22. The improvement in the method of simultaneously thickening superposed bodies of pulp, which comprises separately feeding fresh pulp to a plurality of bodies, establishing a continuous column of sludge and connecting the bodies therewith, and effecting in the respective bodies a predetermined pressure at the discharge of the sludge from each body into the column adequate to balance the pressure adjacent the discharge from each body caused in part at least by the column of the sludge.

23. Settling apparatus comprising a settling compartment having a restricted discharge outlet for settled solids, means for maintaining at the outlet hydraulic back-pressure opposing the discharge of solids, and means for applying to the fluid in the settling compartment a substantially uniform hydraulic pressure adequate in combination with the discharge pressure exerted by the accumulation of a predetermined amount of solids in the compartment to balance said back pressure, whereby the accumulation of solids in the compartment in excess of the predetermined amount will overcome back pressure and discharge solids through said outlet in proportion to the excess over the predetermined amount.

24. The improvement in the method of simultaneously thickening superposed bodies of pulp which comprises maintaining a continuous column of sludge throughout the bodies of pulp undergoing thickening, separately feeding fresh pulp to each body of pulp, overflowing supernatant liquid from each body of pulp, underflowing sludge from the continuous column of sludge, and balancing the combined hydraulic pressures of the overflowing columns of supernatant liquid with the hydraulic pressure exerted in part at least by said column of sludge.

In testimony whereof I affix my signature.

WILLIAM C. WEBER.